(12) United States Patent
Jörn (10) Patent No.: US 11,858,224 B2
(45) Date of Patent: Jan. 2, 2024

(54) TEXTILE FIBER-COMPOSITE MATERIAL PRECURSOR, AND METHOD FOR PRODUCING A COMPONENT FROM FIBER-COMPOSITE MATERIAL

(71) Applicant: AIRBUS OPERATIONS GMBH, Hamburg (DE)

(72) Inventor: Paul Jörn, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 298 days.

(21) Appl. No.: 17/199,667

(22) Filed: Mar. 12, 2021

(65) Prior Publication Data

US 2021/0283867 A1 Sep. 16, 2021

(30) Foreign Application Priority Data

Mar. 13, 2020 (DE) ...................... 10 2020 107 053.5

(51) Int. Cl.
*B29C 70/46* (2006.01)
*B29C 70/08* (2006.01)
(Continued)

(52) U.S. Cl.
CPC .......... *B29C 70/465* (2013.01); *B29C 70/086* (2013.01); *B32B 5/024* (2013.01);
(Continued)

(58) Field of Classification Search
CPC ..... B29C 70/465; B29C 70/086; B29C 70/40; B29C 70/026; B32B 5/024; B32B 5/12;
(Continued)

(56) References Cited

U.S. PATENT DOCUMENTS

2014/0168847 A1* 6/2014 Mueller ............... B29C 70/885
361/220
2016/0311175 A1 10/2016 Beraud et al.
2017/0282491 A1* 10/2017 Tsotsis .................... B32B 5/06

FOREIGN PATENT DOCUMENTS

EP 2743064 A1 6/2014
WO WO 2014/120347 A1 8/2014
WO WO 2019/054454 A1 10/2020

OTHER PUBLICATIONS

German Search Report for Application No. 102020107053.5 dated Nov. 19, 2020.

* cited by examiner

*Primary Examiner* — Brian Handville
(74) *Attorney, Agent, or Firm* — KDW FIRM PLLC (57) ABSTRACT

A textile fiber-composite material precursor and method for producing a component from fiber-composite material. Aircraft components can be produced from polymer fiber-composite materials, a matrix of which can be a high-performance plastics material such as polyether ketone ketone wherein a reinforcement of a non-crimp fabric of carbon fibers is embedded. Large-area non-crimp fabrics and large-area polymer films can be consolidated while being heated and pressed forming simple components. The flexible textile fiber-composite material precursor includes a stack of woven-fabric tiers from a polymer and of non-crimp fabric tiers from carbon fibers. Since both components are capable of draping, the fiber-composite material precursor can be deposited over a large area on curved shape-imparting surfaces and subsequently be consolidated under pressure and heated to form the fiber-composite material.

14 Claims, 3 Drawing Sheets

(51) Int. Cl.
- B64C 1/00 (2006.01)
- B32B 5/02 (2006.01)
- B32B 5/12 (2006.01)
- B32B 27/12 (2006.01)
- B32B 15/14 (2006.01)
- B32B 15/08 (2006.01)
- B32B 15/20 (2006.01)
- B29K 101/12 (2006.01)
- B29K 71/00 (2006.01)
- B29L 31/30 (2006.01)

(52) U.S. Cl.
CPC ............ B32B 5/12 (2013.01); B32B 15/08 (2013.01); B32B 15/14 (2013.01); B32B 15/20 (2013.01); B32B 27/12 (2013.01); B64C 1/00 (2013.01); *B29K 2065/00* (2013.01); *B29K 2071/00* (2013.01); *B29K 2101/12* (2013.01); *B29L 2031/3076* (2013.01); *B32B 2250/20* (2013.01); *B32B 2260/023* (2013.01); *B32B 2260/046* (2013.01); *B32B 2262/106* (2013.01); *B32B 2605/18* (2013.01); *B64C 2001/0072* (2013.01); *Y10T 442/3447* (2015.04)

(58) Field of Classification Search
CPC ......... B32B 15/08; B32B 15/14; B32B 15/20; B32B 27/12; B32B 2250/20; B32B 2260/023; B32B 2260/046; B32B 2262/106; B32B 2605/18; B64C 1/00; B64C 2001/0072; B64C 1/10; B64C 1/12; B29K 2065/00; B29K 2071/00; B29K 2101/12; B29L 2031/3076; Y10T 442/3447; Y02T 50/40
See application file for complete search history.

TEXTILE FIBER-COMPOSITE MATERIAL PRECURSOR, AND METHOD FOR PRODUCING A COMPONENT FROM FIBER-COMPOSITE MATERIAL

CROSS-REFERENCE TO RELATED APPLICATION

This application claims priority to German Patent Application No. 102020107053.5 filed Mar. 13, 2020, the entire disclosure of which is incorporated by reference herein.

TECHNICAL FIELD

The disclosure herein relates to a textile fiber-composite material precursor, to a method for producing components, preferably for aircraft, from fiber-composite material, and to the use of high-performance plastics materials in the form of a textile planar structure for the production of the fiber-composite material precursor or the fiber-composite material.

BACKGROUND

Components for aircraft such as the external skin or fuselage shells are increasingly produced from fiber-composite materials having a polymer matrix. This enables a saving in terms of weight and consequently a reduction in terms of fuel consumption. Moreover, the manufacturing costs can be lowered on account of production processes from the field of polymer technology being applied. This enables increased automation of the production steps with the objective of carrying out the entire production in a continuous manufacturing line which is dominated by industrial robots.

Fiber-composite materials based on thermosetting polymers in which carbon fibers are embedded as a reinforcement material are currently used above all in the aerospace industry. Curable epoxy resins are often the initial material for the thermosetting matrix herein.

Fiber-composite material precursors such as prepregs of pre-cured epoxy resin with embedded carbon fibers are used in the form of flexible tapes, for example, which by automated tape laying (ATL method) or automated fiber placement (AFP method) are deposited on a shape-imparting tool surface with the aid of a laying robot. The deposited prepreg is then consolidated under high pressure and at a high temperature so as to form a component precursor or a component.

The use of the flexible tapes from a fiber-composite material precursor enables component contours which are not flat, such as concave or convex structures, for example cylindrical structures, to be implemented. For particularly complex contours, the tapes are additionally cut into narrower tapes, also referred to as sliced tapes, which offer an even greater degree of flexibility when constructing a complex shape.

A new class of polymer has been developed in the form of thermoplastic high-performance plastics materials which are suitable for producing thermoplastic fiber-composite materials for the aerospace industry. Examples of thermoplastic fiber-composite materials of this type include polyether ether ketone (PEEK) or polyether ketone ketone (PEKK) as a matrix having reinforcing carbon fibers embedded therein. An advantage of thermoplastic materials in comparison to thermosetting materials lies in that the former can be brought to the melted state. The processing is simplified on account thereof. Moreover, these polymers can be recycled.

Thermoplastic fiber-composite materials can likewise be converted to the shape of tapes which can be used in the AFP method. For example, curved fuselage shells and external skin portions can thus be generated from a thermoplastic fiber-composite material. When using tapes cut to a narrower width it is also possible for components with a double curvature, such as the aft pressure bulkhead of an aircraft, to be produced by the AFP method.

One disadvantage of the AFP method lies in that a very large number of tapes have to be deposited on a shape-imparting tool surface until a component blank is obtained. This procedure is time-intensive, on account of which the production costs are increased. Moreover, the procurement of the laying robots is cost-intensive.

A promising technology for reducing costs is the use of a large-area textile non-crimp fabric, hereunder also referred to as "NCF material", as a reinforcement material and of a thermoplastic polymer for the matrix.

In a first method, the non-crimp fabric is draped over a cylindrical shape-imparting tool surface. The polymer film is applied in the form of tapes with a width of 90 mm to 150 mm. An expanded copper foil as a lightning strike protection (LSP) forms the final item. This assembly is heated under pressure. The polymer softens or melts and under the prevailing pressure penetrates the non-crimp fabric so as to form the matrix.

In a second method, the dry non-crimp fabric and the stiff thermoplastic polymer film are fed to a double-belt press and compressed in the latter under the effect of heat and pressure so as to form a flat fiber-composite material. The fiber-composite material by hot-rolling is then formed to a cylindrically configured component with a desired radius.

Due to the stiffness of the thermoplastic polymer, these two methods permit exclusively the production of components which have at most one curvature, thus have at most one curvature radius, such as cylindrically shaped components. Due to the limited draping capability, or the lack thereof, the method cannot be used for spherically shaped components. Therefore, the technology for components having at least a double curvature remains unchanged and is composed of an AFP method with tapes cut to a narrow width, or patches, from thermoplastic polymer.

SUMMARY

It is an object of the disclosure herein to provide an improved composite precursor for aircraft components and an improved method for producing aircraft components of this type.

The object is achieved by the subject matter disclosed herein.

Advantageous design embodiments are also disclosed herein.

According to a first aspect, the disclosure herein achieves a textile fiber-composite material precursor comprising a plurality of tiers of flexible textile planar structure which are disposed on top of one another, wherein one or a plurality of tiers are matrix precursor tiers from a textile planar structure from thermoplastic polymer material, and one or a plurality of tiers are reinforcement tiers from a textile planar structure from reinforcement fibers.

It is preferable for the matrix precursor tiers to be selected from the group that comprises woven fabrics, non-crimp fabrics, non-woven fabrics, and felts, and/or the reinforcement tiers are non-crimp fabrics.

It is preferable for the thermoplastic polymer material to comprise one or a plurality of polymers, or to be composed of one or a plurality of polymers, which are selected from the group of thermoplastic high-performance plastics materials.

It is preferable for the reinforcement fibers to be carbon fibers and/or aramid fibers.

It is preferable for the thermoplastic high-performance plastics materials to be selected from a group that comprises polyaryletherketones such as polyether ketone (PEK), polyether ether ketone (PEEK) and polyether ketone ketone (PEKK), and polyphenylene sulfide.

It is preferable for the matrix precursor tiers and the reinforcement tiers to deposited on top of one another in one of the following arrangements:

$(A_mB_n)_x,$ $(A_mB_n)_xA_m,$ $(A_mB_m)_xA_n(B_mA_m)_y,$ or $A_m(B_nA_n)_xB_nA_m$ wherein the indices m, n, x and y independently of one another represent an integer in the range from 1 to 10, and preferably 1 to 5, and the indices m and n even more preferably represent 2 or 3.

For the arrangement $(A_mB_n)_x$ where m=n=1 and x=5, this results in a stacking or tier order A B A B A B A B A B, for example. In this and all other stacking of tiers A and B it is guaranteed that the spacing between the matrix precursor tiers A is only minor, and the reinforcement tiers B disposed therebetween, due to the only short distances to be covered, are completely impregnated during consolidation—despite the high viscosity of the softened or melted polymer material.

It is preferable for the matrix precursor tiers and the reinforcement tiers to be deposited on top of one another in the arrangement:

AAA BBB AAA BBB AA BBB AAA BBB AAA or
AAA BB AA BB AA BB AA BB AAA

The use of groups or units from two or three matrix precursor tiers A and of groups or units from two or three reinforcement tiers B leads to a fiber-composite material in which the fibers are completely impregnated with polymer and pores are absent.

It is preferable for the matrix precursor tiers to have a thickness in the range from 20 μm to 100 μm, preferably 20 μm to 80 μm.

It is preferable for the matrix precursor tiers to be woven fabrics with twill weaves and/or woven fabrics with satin weaves.

It is preferable for at least two reinforcement tiers to form a non-crimp fabric in which the orientation of the reinforcement fibers between neighboring reinforcement tiers varies by a predefined angle such as 15°, 30°, 45°, 60°, 75° or 90°.

It is preferable for two reinforcement tiers to form a bi-axial non-crimp fabric in which the reinforcement fibers from one tier to another tier are mutually rotated by, for example, 15°, 30°, 45°, 60°, 75° or 90°.

It is preferable for three reinforcement tiers to form a tri-axial non-crimp fabric in which the reinforcement fibers from one tier to another tier are mutually rotated by, for example, 15°, 30°, 45°, 60°, 75° or 90°.

It is preferable that three reinforcement tiers form a tri-axial non-crimp fabric which has an area weight in the range from 250 to 450 g/m$^2$, preferably 300 to 400 g/m$^2$.

It is preferable for the fiber-composite material precursor to be configured in the form of a multi-tier sheet having a size which enables the shape-imparting surface of a molding tool to be covered completely or to an exact fit. Due to the high draping capability of the individual tiers and of the fiber-composite material precursors, it is thus possible for an aft pressure bulkhead to be produced from a single multi-tier sheet, a single multi-tier mat, or a single contiguous fiber-composite material precursor, for example. This possibility does however not only exist for spherically shaped components or components with at least two curvature radii, but also for cylindrically shaped components such as cylinder shell surfaces with a single curvature radius, and for flat planar components.

It is preferable for the textile fiber-composite material precursor to comprise one or a plurality of metallic conductive tiers such as a metal foil, preferably an expanded copper foil (ECF) as a lightning strike protection (LPS).

According to a second aspect, the disclosure herein achieves a method for producing a component or a component precursor from fiber-composite material, preferably for an aircraft, the method comprising the following steps:
 a) providing a molding tool comprising a first tool part having a shape-imparting surface and at least one second tool part having a surface which is adapted to the shape-imparting surface;
 b) depositing a preferred textile fiber-composite material precursor, or configuring a preferred fiber-composite material precursor, on the shape-imparting surface by placing the matrix precursor tiers and the reinforcement tiers on top of one another in the desired order;
 c) pressing the at least one second tool part onto the textile fiber-composite material precursor and the first tool part until the desired pressure is exerted on the textile fiber-composite material precursor;
 d) heating the textile fiber-composite material precursor until the thermoplastic polymer material of the one or the plurality of matrix precursor tiers softens or melts, such that the softened or melted thermoplastic polymer material penetrates or impregnates the one or the plurality of tiers;
 e) cooling, or leaving to cool, the formed fiber-composite material with the shape of a component or of a component precursor; and
 f) retrieving the component or the component precursor.

The fiber-composite material precursor can be produced separately from the molding tool by stacking the tiers A and the tiers B, and then be deposited as a completed stacked assembly on the shape-imparting surface of the molding tool. The fiber-composite material precursor can however also be produced by depositing the tiers A and B directly on the shape-imparting surface of the molding tool. In both cases, it is possible for individual tiers A and tiers B to be successively stacked. However, it is also possible for units from a plurality of tiers such as, for example stacks AA and/or AAA and/or stacks BB and/or BBB in which the reinforcement fibers are optionally disposed so as to be bi-axial or tri-axial, to be prepared and for these prepared stacks to be subsequently joined so as to form fiber-composite material precursors.

According to a third aspect, the disclosure herein achieves a method for producing a component or a component precursor from fiber-composite material, preferably for an aircraft, the method comprising the following steps:
 a) providing a molding tool having a shape-imparting surface b) depositing the preferred textile fiber-composite material precursor, or configuring the preferred fiber-composite material precursor, on the shape-imparting surface by placing the matrix precursor tiers and the reinforcement tiers on top of one another in the desired order;

c) encasing the molding tool with a vacuum bag and applying a vacuum to the vacuum bag;

d) heating the textile fiber-composite material precursor until the thermoplastic polymer material of the one or the plurality of matrix precursor tiers softens or melts, such that the softened or melted thermoplastic polymer material penetrates or impregnates the reinforcement tiers;

e) cooling, or leaving to cool, the formed fiber-composite material with the shape of a component or a component precursor; and f) removing the vacuum bag and retrieving the component of the component precursor from the molding tool.

It is preferable for the textile fiber-composite material precursor to be heated to a temperature above the softening temperature or the melting temperature of the thermoplastic polymer material of the matrix precursor tiers.

It is preferable for the pressure acting on the textile fiber-composite material precursor to be in the range from 5 to 50 bar, preferably 10 to 40 bar.

It is preferable for the shape-imparting tool surface to be configured so as to be flat, concave, convex, concave and convex, cylindrical, male, female, having at least two different curvature radii, or spherical.

According to a fourth aspect, the disclosure herein achieves a component or a component precursor, preferably for use in an aircraft. The component or the component precursor is obtainable from a preferred textile fiber-composite material precursor or by a preferred method.

It is preferable for the component or the component precursor to have a shape having at least two curvature radii or to be configured so as to be spherical. It is preferable for the component or the component precursor to be a frame component, a fuselage component, or a component of the casing of an aircraft.

According to a fifth aspect, the disclosure herein achieves an aircraft comprising a preferred component.

According to a sixth aspect, the disclosure herein achieves the use of a high-performance plastics material such as polyaryletherketone or polyphenylene sulfide, in the form of a textile planar structure, preferably in the form of a woven fabric, a non-woven fabric, a felt or a non-crimp fabric, for the production of a textile fiber-composite material precursor or a fiber-composite material in which the reinforcement fibers are preferably carbon fibers and/or aramid fibers which are preferably present in the form of non-crimp fabrics.

The textile fiber-composite material precursor can be produced by stacking the material precursor tiers and the reinforcement tiers on top of one another, and can then be deposited on a shape-imparting surface of a tool. The textile fiber-composite material precursor can however also be configured directly on a shape-imparting surface of a tool. In both cases, the matrix precursor tiers and the reinforcement tiers can be deposited on top of one another individually or in groups of prepared matrix precursor tiers and groups of prepared reinforcement tiers.

BRIEF DESCRIPTION OF THE DRAWINGS

Example embodiments will be explained in more detail hereunder by the appended drawings in which.

DETAILED DESCRIPTION

Figure 1:
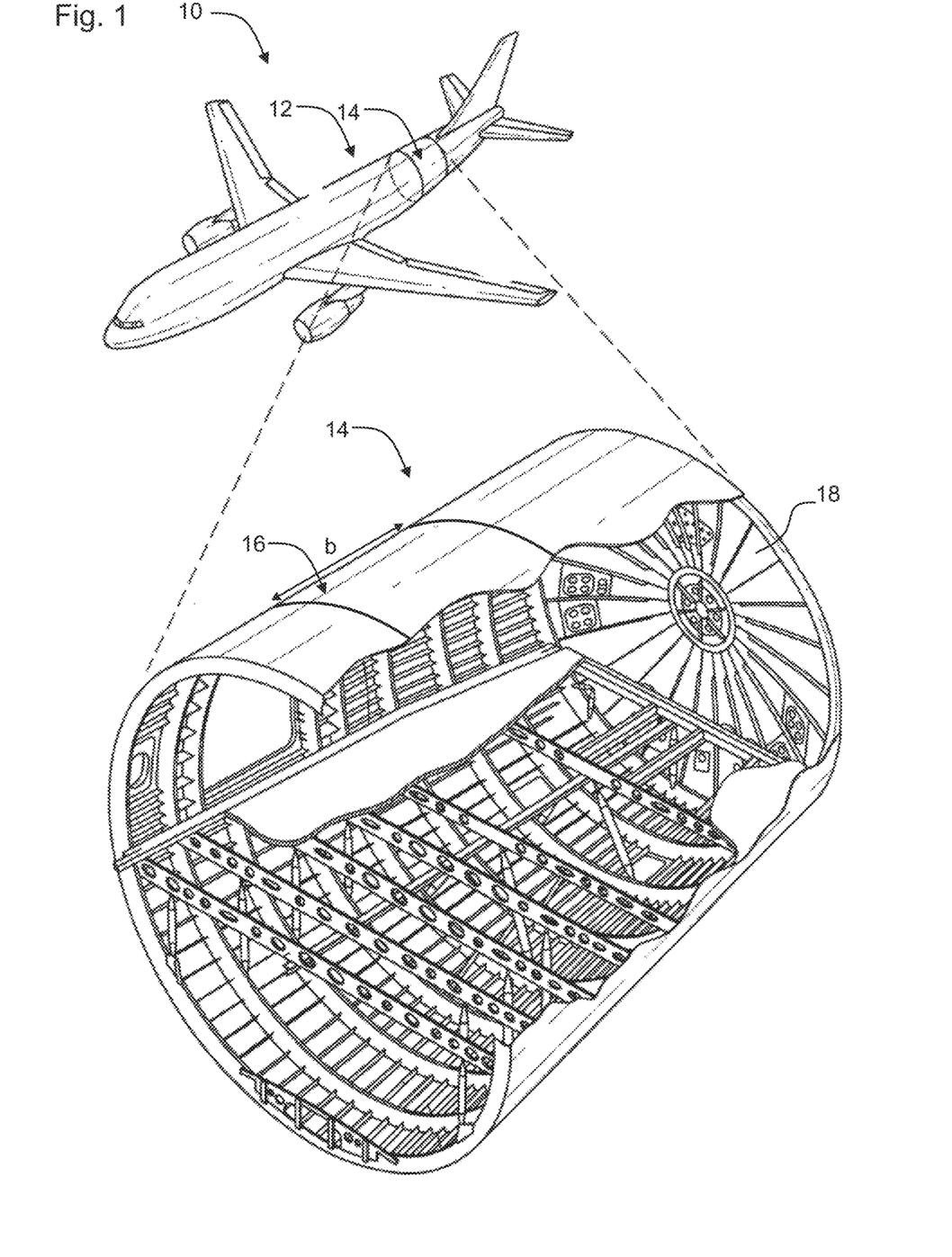
FIG. 1 shows a three-dimensional view of an aircraft and an enlargement of a fragment of a fuselage section of this aircraft in the region of the aft pressure bulkhead.

FIG. 1 shows a three-dimensional view of an aircraft 10 having a fuselage 12 and a fuselage section 14. FIG. 1 furthermore contains an enlargement of a fragment of the fuselage section 14. A fuselage shell 16 and the aft pressure bulkhead 18 are, inter alia, illustrated in the enlarged fragment.

The fuselage shell 16 has the shape of a portion of a shell surface of a cylinder. By virtue of the design embodiment thereof having only one radius, the fuselage shell 16, proceeding from a non-crimp fabric from carbon fibers, can be produced by a direct depositing method or with the aid of a double-belt press.

In the direct depositing method, a tier from a bi-axial non-crimp fabric or NCF material of carbon fibers ("non-crimp fabric direct layup" or "NCF direct layup") is placed directly on a male or convex consolidation tool and stapled to the tool and a preceding tier which is optionally present. A metallic conductive tier, for example in the form of an expanded copper foil, is disposed thereabove as a lightning strike protection (LPS) as uppermost tier.

Tapes of the thermoplastic high-performance plastics material (90-150 mm) are subsequently cut into narrower tapes which by a flat ATL method are then applied as an overarching matrix material to the material tiers deposited on the cylinder surface (generation of a prepreg). Local reinforcements can be additionally produced by a flat ATL method and integrated in the consolidation tool. The composite material precursor is subsequently consolidated at an elevated pressure and at a temperature above the melting temperature of the high-performance plastics material.

In summary, large-area reinforcement material tiers in the form of non-crimp fabrics can be used in a time-saving manner in this method. The matrix from a thermoplastic polymer in the form of narrow tapes is however still applied by an ATL method.

In the method using a double-belt press, dry non-crimp fabrics of carbon fibers and films from thermoplastic high-perform plastics material are conjointly fed to a double-belt press. The thermoplastic polymer melts in the double-belt press and impregnates the dry non-crimp fabric of carbon fibers. A preliminary consolidation of the infed material tiers so as to form a flat continuous organic sheet takes place under the prevailing pressure. The sheet has a specific layup and the width b desired for the fuselage shell.

The flat organic sheet is cut to size. The cut-to-size blank is cylindrically shaped with the desired radius by hot-rolling.

The radius r can be 2000 mm for example. A discontinuous preform is obtained. The laminate forming the base for the external skin has a uniform thickness.

In summary, large-area reinforcement material tiers in the form of non-crimp fabrics and large-area films from thermoplastic high-performance plastics material can be used in a time-saving manner in this method. However, the films have a high degree of stiffness. Therefore, the films can be processed in a double-belt press and with subsequent hot-rolling only so as to form cylindrical shapes with one radius.

The two methods are however unsuitable for producing the aft pressure bulkhead 18 of the aircraft according to FIG. 1. A pressure bulkhead of this type has a spherical shape. The spherical shape of a pressure bulkhead or of other complex curved components in the present description is also referred to as a shape with a double curvature, at least a double curvature, or as a shape or a component, respectively, with two or at least two curvature radii. In other words, the term spherical shape includes all shapes which have a curvature or contour that is more complex than a cylinder in which the curvature can be described by a single curvature radius.

Components having a spherical shape, such as the aft pressure bulkhead 18, can neither be produced by the direct depositing method nor with the aid of a double-belt press. The components to date are produced by an automated fiber placement (AFP) method.

For example, the aft pressure bulkhead for the Airbus A380 with the aid of an AFP method can be produced by depositing tapes from thermoplastic CRP composite material on the shape-imparting surface and by consolidating (heating while impinged with pressure) of the blank.

In very general terms, for the production of spherical components based on a thermoplastic fiber-composite material it has to date been necessary for tapes from a thermoplastic fiber-composite material to be deposited on the shape-imparting surface of a male or female molding tool. The layup herein comprises the base laminate having large-area reinforcement tiers disposed therebetween and, as a last tier, an expanded copper foil as a lightning strike protection. Local reinforcements and stringers 32 are integrated on the, optionally pre-consolidated, component such as an external skin laminate. The consolidation can be carried out in an autoclave or with the aid of a vacuum bag.

Since this method is time-consuming and cost-intensive, there is a demand for improved materials and methods.

Figure 2:
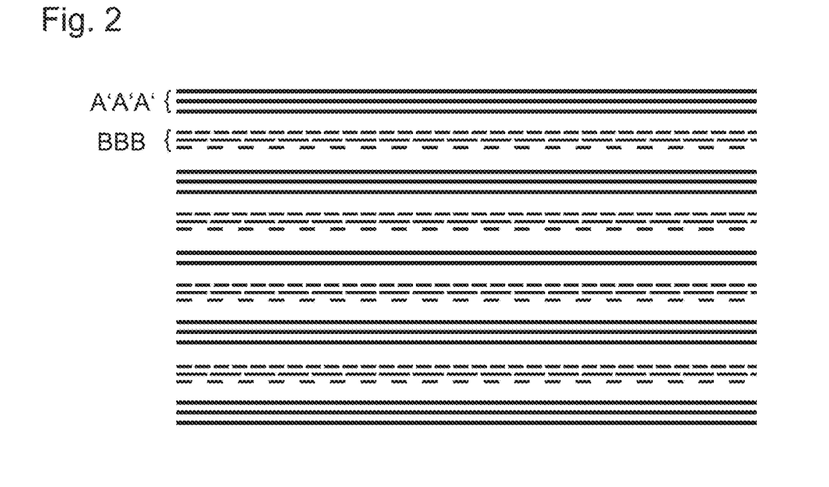
FIG. 2 shows a fiber-composite material precursor which has been used in a preliminary trial and comprises matrix precursor tiers from polyether ketone ketone and reinforcement tiers in the form of a non-crimp fabric from carbon fibers.

In a preliminary test, the behavior of melted polyether ketone ketone (PEKK) was observed in a fiber-composite material precursor which in a layered manner was constructed from matrix precursor tiers A' in the form of PEKK films and reinforcement tiers B in the form of non-crimp fabrics from carbon fibers at high pressure in a closed molding tool.

FIG. 2 shows the sequence of the tiers A' and the tiers B. The eight tiers B are joined so as to form four bi-axial non-crimp fabrics. The 12 tiers A' are joined so as to form stacks from two or three PEKK films. The PEKK film has a thickness of approximately 40 μm, for example. The fiber-composite material precursor has the following sequence or stacking:

A'A'A' BB A'A' BB A'A' BB A'A' BB A'A'A'.

This composite material precursor is consolidated in a molding tool at a pressure of, for example, 40 bar and at a temperature which is above the melting temperature of PEKK, for example.

Figure 3:
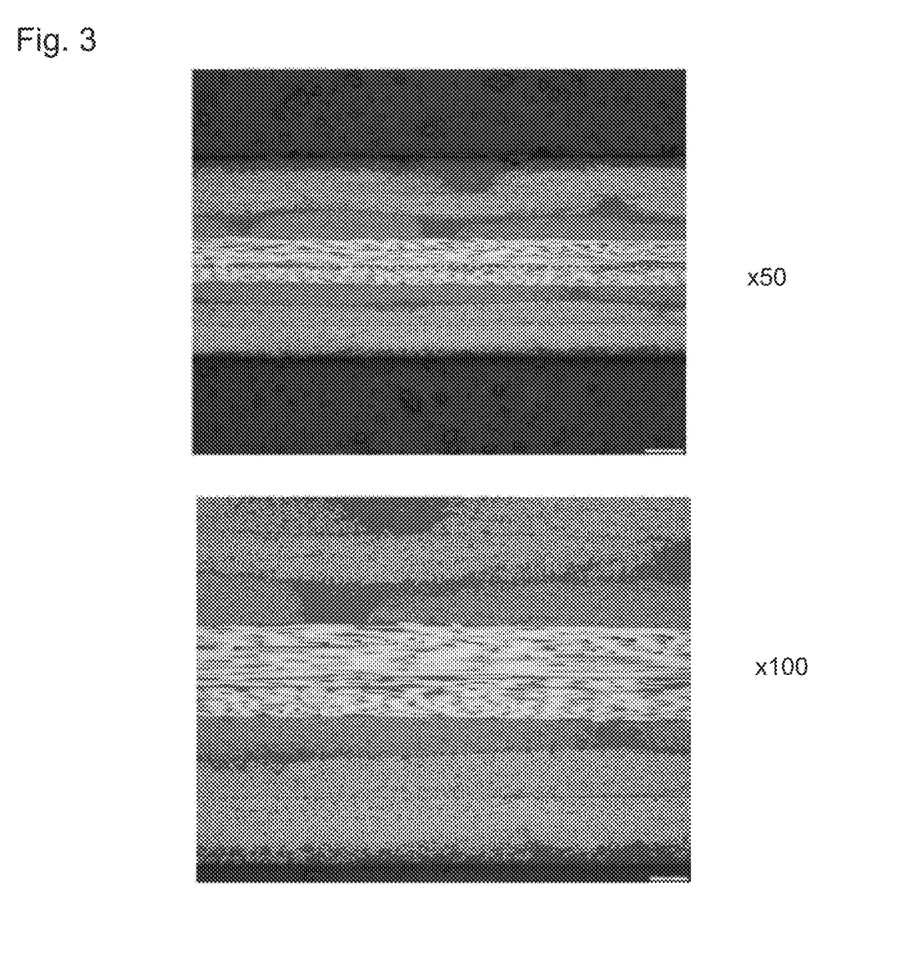
FIG. 3 shows microscopic images of the fiber-composite material produced from the precursor according to FIG. 2.

FIG. 3 shows two microscopic photographs with an enlargement factor of 50 and 100, respectively, which have been recorded from micro-sections of the consolidated composite material precursor. The bi-axial non-crimp fabric (NCF material) is completely impregnated with PEKK during the consolidation. There are no pores or dry regions. Accordingly, PEKK above its melting temperature and under high pressure a suitable for completely impregnating carbon fibers in a bi-axial non-crimp fabric or NCF material.

Figure 4:
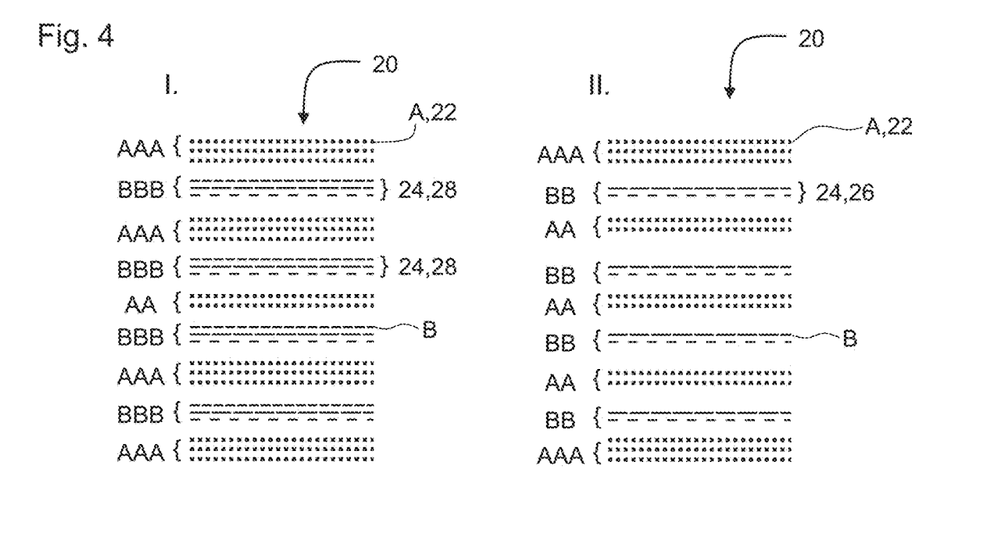
FIG. 4 shows two examples I and II for textile fiber-composite material precursors comprising matrix precursor tiers from a woven fabric from a polymer material and reinforcement tiers from a non-crimp fabric from carbon fibers.

FIG. 4 shows the layer sequence of two textile composite material precursors 20 according to example I and example II.

The precursor according to example I comprises 14 matrix precursor tiers A, 22 from a woven PEKK fabric 22, and 12 reinforcement tiers B from a non-crimp fabric 24, 28 from carbon fibers.

The 14 matrix precursor tiers A are joined so as to form five units from two or three material precursor tiers A, respectively. The 12 reinforcement tiers B are joined so as to form four units in the form of tri-axial non-crimp fabric 28 from carbon fibers.

This results in a sequence of tiers:

AAA BBB AAA BBB AA BBB AAA BBB AAA.

The composite material precursor 20 according to example II comprises 12 matrix tiers A, 22 from a woven PEKK fabric 22, and eight reinforcement tiers from a non-crimp fabric 24 from carbon fibers.

The 12 matrix tiers A, 22 are joined so as to form five units from two or three matrix tiers A, respectively. The eight reinforcement tiers B are joined so as to form four units in the form of a bi-axial non-crimp fabric 26 from carbon fibers.

This results in a sequence of tiers:

AAA BB AA BB AA BB AA BB AAA
±45° 0°/90° 0°/90°±45°

The angles indicated below BB reflect the orientation of the reinforcement fibers, preferably carbon fibers, in the fiber-composite material precursor.

The textile composite material precursors 20 according to examples I and II from the tiers A and B can first be joined so as to form the composite material precursor 20, the latter then being deposited on the shape-imparting surface 36 of the molding tool 34. Alternatively, the textile composite material precursor 20 by depositing the individual tiers can also be joined directly on the shape-imparting surface 36.

The tiers A and B in these two alternatives can be deposited individually on top of one another. It is however also possible for a plurality of tiers A to first be joined so as to form units such as AA or AAA, and/or for a plurality of tiers B to be joined so as to form multi-axial units, such as BB to form a bi-axial non-crimp fabric 26 or BBB to form a tri-axial non-crimp fabric 28. These units and/or multi-axial units can then be stacked on top of one another while forming the textile composite material precursor 20.

Figure 5:
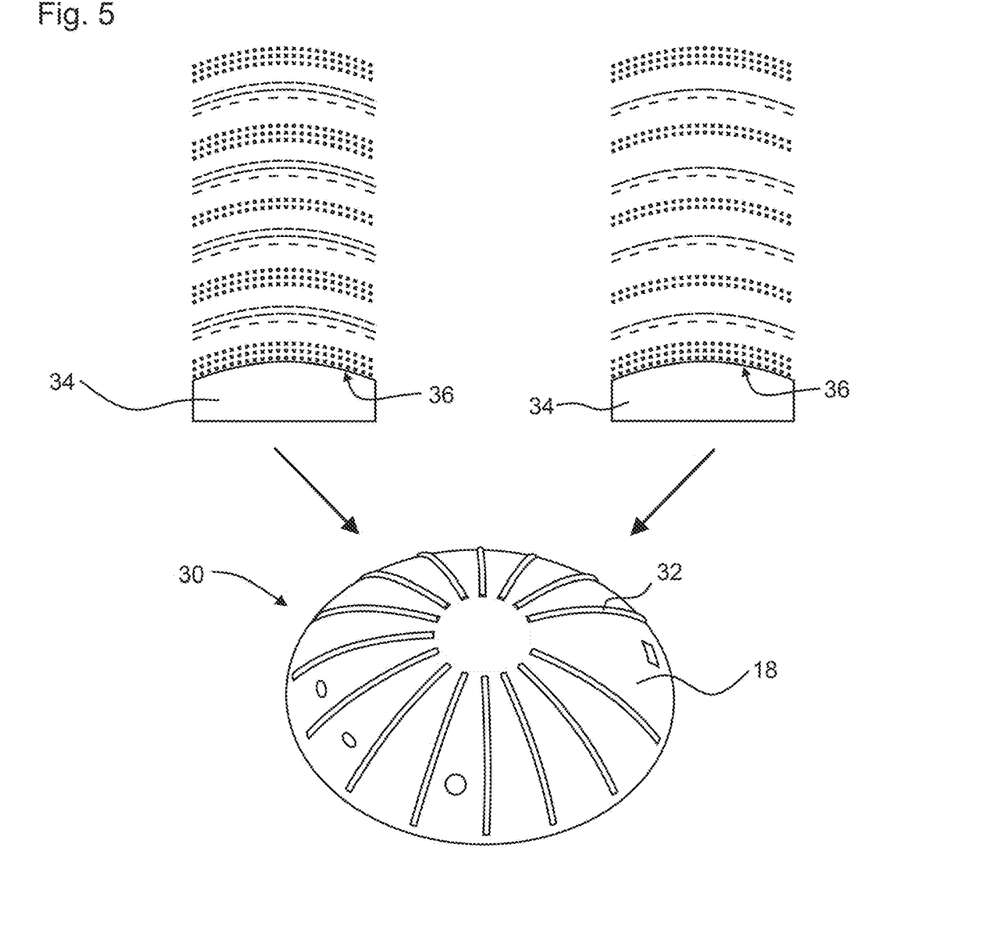
FIG. 5 shows the fiber-composite material precursor deposited on a shape-imparting surface, and the component produced therefrom by consolidation.

FIG. 5 in a heavily simplified manner shows the production of a component 30, here an aft pressure bulkhead 18, from the flexible textile fiber-composite material precursor 20. The textile composite material precursor 20 is configured on the shape-imparting surface 36. Due to the positive draping capability of the textile tiers A and B, the textile composite material precursor 20 assumes the contour of the surface.

The component 30, here the aft pressure bulkhead 18, is obtained after the method described here has been carried out. The fiber-composite material is free of pores. Likewise, no spots which are free of the matrix are established.

It is furthermore possible, as is illustrated in FIG. 5, for local reinforcement elements such as stringers 32 to be placed on the pre-consolidated or the consolidated fiber composite material.

When the fiber-composite material is used for the external skin, an upper final tier from an expanded copper film (ECF) can also be implemented as a lightning strike protection (LSP). The thermoplastic polymer material of the matrix precursor tiers A when in contact with the LSP material proves helpful herein.

Various aspects of the disclosure herein will be summarized once again hereunder.

In the context of the development of future aircraft fuselages, the use of thermoplastic materials (TP materials) for airframes and aircraft fuselage structures is one of the fundamental topics. The most technically mature solution is currently the AFP arrangement of tapes and cut-to-size tapes of TP materials for the external skin and parts of the casing.

In the prior art, the most promising technology in terms of costs lies in thermoplastic NCF (non-crimp fabric) casings for the cylindrical regions. Since the standard NCF material having an enclosed TP matrix cannot be used in the spherical regions due to the restrictions in terms of the draping capability, the technology for regions with a double curvature still lies in an AFP method having cut-to-size tapes. The matrix in the TP/NCF approach is usually implemented by a resin foil (strong and stiff) or by powder on the NCF (sets the NCF).

The following NCF methods are currently proposed for cylindrical regions:
(A) NCF direct layup:
  NCF as a bi-axial material is placed directly in a male consolidation tool and stapled to the tool and the preceding tier;
  LSP is placed as the last tier and stapled to the preceding NCF tier;
  impregnating and consolidating are carried out in a pressurized cycle of a consolidating press;
  reinforcements (collective and local) are produced by a flat ATL and integrated in the consolidation tool.

The NCF direct layup comprises: NCF+matrix→direct layup of NCF in a male consolidation tool (including LSP)→slitting the tape (90-150 mm)→producing the flat ATL reinforcement (prepreg)→integration of the reinforcement→consolidation method.

(B) Double-belt press (casing with a single curvature)
  double-belt press technology using dry-fiber NCFs and thermoplastic resin films and foils;
  dry fibers and resin films are fed to a double-belt press, and NCF is impregnated and pre-consolidated so as to form a flat, continuous organic sheet with a special layup and a width for aircraft fuselage casings;
  the flat organic sheet is cut and hot-rolled to the desired radius (for example, r=2000 mm).

This creates a discontinuous preform from a skin base laminate (of identical or constant thickness).

The method using the double-belt press comprises: NCF+matrix→double-belt press for base skin (including LSP) →slitting the tape (90-150 mm)→producing the flat ATL reinforcement (prepreg)→integration of the reinforcement-→consolidation method.

Current method for regions with a double curvature:
(C) Female/male AFP method (casing with a double curvature)
  automated fiber placement (AFP) method of thermoplastic tapes cut into narrower tapes in a female or male mold;
  use of pre-impregnated thermoplastic material;
  layup of the base laminate with interposed reinforcements;
  local reinforcements and stringers are integrated on the (pre-) consolidated skin laminate.

The AFP method using a female/male shape-imparting surface comprises:
Prepreg of cut-to-size tapes layup of the complete skin on the female or male shape-imparting surface LSP layup (AFP) consolidation method.

The cost advantages by virtue of the high laying rates when using NCF are substantiated by the aft pressure bulkhead of the Airbus A380 and in the concepts of the "Wing of Tomorrow".

The latest NCF application lies in the use of NCF in the door frames of the Airbus A350, on account of which savings are achieved in terms of the reoccurring costs.

The cost analysis for typical frames for aircraft fuselages have also demonstrated the great cost savings on account of the NCF concept, this however limited to the cylindrical casings.

Preliminary tests with flat boards and resin films (thermoplastic) have shown promising results. The preliminary tests were used with two composite-material precursors with the following experimental layup:
  Variant 1: 14 tiers of PEKK foil (40 µm) (tiers A)
    four tiers from tri-axial NCF (350 g/m$^2$) (tiers B)
  The stacking was AAA BBB AAA BBB AA BBB AAA BBB AAA.
  Variant 2: 12 tiers of PEKK foil (40 µm) (tiers A)
    four tiers from bi-axial NCF (tiers B)
  The stacking was AAA BB AA BB AA BB AA BB AAA.

FIG. 3 shows microscopic photographs with the enlargement factor of 50 or 100, respectively, of micro-sections of the fiber-composite material obtained by the variant 2. A complete impregnation of the NCF material could be achieved thereafter. No pores and dry regions could be observed.

NCF technology and a method for thermoplastic matrix casings with a double curvature enables a short lead time and advantages in terms of the reoccurring costs for the regions with the double curvature.

The disclosure herein relates to a concept for implementing the matrix in the NCF material in such a manner that the draping of the material is not blocked and draping is possible.

The NCF concept can likewise be applied in the regions with the double curvature. The following advantages can be achieved:
  lower costs in the production of the external skin;
  use in other curved casing-type components, such as the aft pressure bulkhead;
  application in curved components of the frame.

The following aspects are of importance:
  The matrix is used in intervening tiers. This is important because the viscosity is very high. The impregnation is thus guaranteed. The tiers are thin or of a medium thickness for aircraft external skins (the tiers may be thicker for other applications);
  homogenous distribution;
  the matrix remains positively distributed, also after draping;
  The matrix does not prevent the draping of the NCF. The NCF can otherwise not be impregnated or the matrix cannot be welded on the NCF;
  The matrix enables the required design features such as inclines (ramps), sloping tiers.

By way of these characteristics it is possible for NCF to be used for a (spherical) fuselage skin with a double curvature or for other curved complex components. Real cost advantages can be achieved in comparison to the standard AFP method which is used for such parts.

A thermoplastic matrix which is produced in the form of a woven fabric is used. The thermoplastic matrix is implemented in an NCF; the production of thermoplastic casings with a double curvature is possible by a high-pressure method.

The PEKK matrix, as is used in aircraft fuselages, is available as a woven fabric. The PEKK matrix is used inter alia as an energy conductor for ultrasonic welding. A woven fabric which is able to be draped in a particularly positive manner is a woven fabric of twill/satin. This also enables a small volume when stacking.

Preferred materials:
bi-axial NCF or tri-axial NCF (the area weight per tier is a function of the matrix viscosity and is chosen such that the impregnation is still possible);
matrix, for example PPS, PEEK, PEKK for (primary structure) in the format of a woven fabric (for example satin, twill).

Method:
male or female method;
layup of NCF and matrix:
1. matrix
2. NCF tier
3. matrix
4 . . .
use of a vacuum bag, or closing the molding tool;
application of heat required for melting the matrix and for the impregnation of the material; pressure able to be applied in the range of 10 to 40 bar, but lower values are also possible;
process window: Sequence temperature/pressure method. Method wind required for the matrix system.

ADDITIONAL ADVANTAGES

The woven matrix fabric can also be a trailblazer for implementing an LSP (lightning strike protection) material in casings with a double curvature. ECF nets which are capable of draping to a limited extent are currently available and can be combined with a concept of this type.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Aircraft
12 Fuselage
14 Fuselage section
16 Fuselage shell
18 Aft pressure bulkhead
20 Textile composite material precursor
22 Woven fabric
24 Non-crimp fabric
26 Bi-axial non-crimp fabric
28 Tri-axial non-crimp fabric
30 Component
32 Stringer
34 Molding tool
36 Shape-imparting surface
A Matrix precursor tier
B Reinforcement tier
C Metallic conductive tier

The invention claimed is:

1. A component or a component precursor formed from a textile fiber-composite material precursor comprising:
a plurality of tiers of flexible textile planar structures disposed on top of one another;
wherein one or more of the plurality of tiers are matrix precursor tiers from a textile planar structure comprising a thermoplastic polymer material;
wherein one or more of the plurality of tiers are reinforcement tiers from a textile planar structure comprising reinforcement fibers;
wherein the one or more matrix precursor tiers and the one or more reinforcement tiers are placed on top of one another in a desired order;
wherein, during formation of the component or the component precursor, the textile fiber-composite material precursor is heated until the thermoplastic polymer material of the one or more matrix precursor tiers softens or melts, such that the softened or melted thermoplastic polymer material of the one or more matrix precursor tiers penetrates or impregnates the one or more reinforcement tiers, such that the reinforcement fibers of the one or more reinforcement tiers are completely impregnated with the thermoplastic polymer material and the textile fiber-composite material precursor is free of pores and dry regions; and
wherein the textile fiber-composite material precursor is configured to cool in a shape of the component or of the component precursor.

2. The component or the component precursor according to claim 1, wherein:
the matrix precursor tiers are selected from the group consisting of woven fabrics, non-crimp fabrics, thermoplastic matrix fabrics, and felts; and
the reinforcement tiers are non-crimp fabrics.

3. The component or the component precursor according to claim 2, wherein:
the thermoplastic polymer material of the one or more matrix precursor tiers comprises one or more polymers, or is composed of one or more polymers, the one or more polymers being selected from thermoplastic high-performance plastics materials; and/or
the reinforcement fibers are carbon fibers and/or aramid fibers.

4. The component or the component precursor according to claim 3, wherein the thermoplastic high-performance plastics materials are selected from the group consisting of polyaryletherketones (PAEK), polyether ketone (PEK), polyether ether ketone (PEEK) and polyether ketone ketone (PEKK), and polyphenylene sulfide.

5. The component or the component precursor according to claim 1, wherein:
the one or more matrix precursor tiers comprises a plurality of matrix precursor tiers;
the one or more reinforcement tiers comprises a plurality of reinforcement tiers; and the plurality of matrix precursor tiers (A) and the plurality of reinforcement tiers (B) are deposited or stacked on top of one another in an arrangement as follows:

$(A_m B_n)_x,$ wherein m, n, x, and y, independently of one another, represent an integer, x and y being in a range from 1 to 10, or in a range of from 1 to 5, and m and n being 2 or 3.

6. The component or the component precursor according to claim 5, wherein the plurality of matrix precursor tiers and the plurality of reinforcement tiers are deposited or stacked on top of one another in an arrangement of:
AAA BBB AAA BBB AA BBB AAA BBB AAA, or
AAA BB AA BB AA BB AA BB AAA.

7. The component or the component precursor according to claim 6, wherein:
the plurality of matrix precursor tiers have a thickness in a range from 20 μm to 100 μm; and
the plurality of matrix precursor tiers are woven fabrics with twill weaves;
wherein:
at least two reinforcement tiers of the plurality of reinforcement tiers form a non-crimp fabric in which an orientation of the reinforcement fibers between neighboring reinforcement tiers varies by a predefined angle;
two reinforcement tiers of the plurality of reinforcement tiers form a bi-axial non-crimp fabric in which the reinforcement fibers from one tier to another tier are mutually rotated;
three reinforcement tiers of the plurality of reinforcement tiers form a tri-axial non-crimp fabric in which the reinforcement fibers from one tier to another tier are mutually rotated; and/or
three reinforcement tiers of the plurality of reinforcement tiers form a tri-axial non-crimp fabric which has an area weight in a range from 250 to 450 g/m$^2$, or in a range from 300 to 400 g/m$^2$; and
wherein:
the textile fiber-composite material precursor is configured in a form of a multi-tier sheet having a size which enables a shape-imparting surface of a molding tool to be covered completely or to an exact fit.

8. The component or the component precursor according to claim 1, wherein the textile fiber-composite material precursor comprises one or a plurality of metallic conductive tiers, a metal foil, and/or an expanded copper foil as a lightning strike protection.

9. The component or the component precursor according to claim 6, wherein:
the plurality of matrix precursor tiers have a thickness in a range 20 μm to 80 μm; and
the plurality of matrix precursor tiers are woven fabrics with satin weaves;
wherein:
at least two reinforcement tiers of the plurality of reinforcement tiers form a non-crimp fabric in which an orientation of the reinforcement fibers between neighboring reinforcement tiers varies by a predefined angle;
two reinforcement tiers of the plurality of reinforcement tiers form a bi-axial non-crimp fabric in which the reinforcement fibers from one tier to another tier are mutually rotated;
three reinforcement tiers of the plurality of reinforcement tiers form a tri-axial non-crimp fabric in which the reinforcement fibers from one tier to another tier are mutually rotated; and/or
three reinforcement tiers of the plurality of reinforcement tiers form a tri-axial non-crimp fabric which has an area weight in a range from 250 to 450 g/m$^2$, or in a range from 300 to 400 g/m$^2$; and
wherein:
the textile fiber-composite material precursor is configured in a form of a multi-tier sheet having a size which enables a shape-imparting surface of a molding tool to be covered completely or to an exact fit.

10. The component or the component precursor according to claim 1,
wherein the component or component precursor:
has a shape having at least two curvature radii or is configured to be spherical; and/or
is a frame component, a fuselage component, or a component of the casing of an aircraft.

11. The component or the component precursor according to claim 1, wherein the component or the component precursor is an aft pressure bulkhead of an aircraft.

12. The component or the component precursor according to claim 1, wherein the textile fiber-composite material precursor comprises, as an outermost tier, an expanded copper foil for providing lightning strike protection.

13. The component or the component precursor according to claim 1, wherein:
the one or more matrix precursor tiers comprises a plurality of matrix precursor tiers;
the one or more reinforcement tiers comprises a plurality of reinforcement tiers; and
the plurality of matrix precursor tiers (A) and the plurality of reinforcement tiers (B) are deposited or stacked on top of one another in an arrangement as follows:

$(A_m B_n)_x A_m,$ wherein m, n, x, and y, independently of one another, represent an integer, x and y being in a range from 1 to 10, or in a range of from 1 to 5, and m and n being 2 or 3.

14. The component or the component precursor according to claim 1, wherein:
the one or more matrix precursor tiers comprises a plurality of matrix precursor tiers;
the one or more reinforcement tiers comprises a plurality of reinforcement tiers; and
the plurality of matrix precursor tiers (A) and the plurality of reinforcement tiers (B) are deposited or stacked on top of one another in an arrangement as follows:

$(A_m B_m)_x A_n (B_m A_m)_y,$ or $A_m (B_n A_n)_x B_n A_m,$ wherein m, n, x, and y, independently of one another, represent an integer, x and y being in a range from 1 to 10, or in a range of from 1 to 5, and m and n being 2 or 3.

* * * * *